(12) United States Patent
Akashe et al.

(10) Patent No.: US 7,989,015 B2
(45) Date of Patent: Aug. 2, 2011

(54) METHODS OF FORMING HEAT STABLE SOY MILK CONCENTRATES

(75) Inventors: Ahmad Akashe, Mundelein, IL (US);
Wen-Sherng Chen, Glenview, IL (US);
Danielle Elizabeth Perkins, Clarendon Hills, IL (US); Mark Richard Thomas Norton, Banbury (GB)

(73) Assignee: Kraft Foods Global Brands LLC, Northfield, IL (US)

( * ) Notice: Subject to any disclaimer, the term of this patent is extended or adjusted under 35 U.S.C. 154(b) by 883 days.

(21) Appl. No.: 11/622,225

(22) Filed: Jan. 11, 2007

(65) Prior Publication Data
US 2008/0171125 A1 Jul. 17, 2008

(51) Int. Cl.
*A23L 1/20* (2006.01)

(52) U.S. Cl. ........ 426/634; 426/477; 426/479; 426/481; 426/506; 426/507

(58) Field of Classification Search ............... 426/634, 426/477, 479, 481, 506, 507
See application file for complete search history.

(56) References Cited

U.S. PATENT DOCUMENTS

| | | | |
|---|---|---|---|
| 4,039,696 A * | 8/1977 | Marquardt et al. | 426/598 |
| 4,409,256 A | 10/1983 | Johnson et al. | |
| 4,514,433 A | 4/1985 | Matsuura | |
| 4,971,825 A * | 11/1990 | Kitazume et al. | 426/598 |
| 5,124,165 A | 6/1992 | Obata et al. | |
| 6,030,650 A | 2/2000 | Kamarei | |
| 6,093,425 A | 7/2000 | Kamarei | |
| 6,103,282 A | 8/2000 | Nakashima | |
| 6,372,782 B1 * | 4/2002 | Patel et al. | 514/456 |
| 2001/0024677 A1 | 9/2001 | Bringe | |
| 2002/0197384 A1 * | 12/2002 | Singh | 426/629 |
| 2004/0037905 A1 | 2/2004 | Bringe | |
| 2004/0182250 A1 | 9/2004 | Halliday et al. | |
| 2004/0197463 A1 | 10/2004 | Gottemoller | |
| 2009/0123618 A1 * | 5/2009 | Gandhi et al. | 426/330.3 |

FOREIGN PATENT DOCUMENTS

| | | |
|---|---|---|
| EP | 0 875 151 A2 | 11/1998 |
| EP | 1 738 651 A1 | 1/2007 |
| GB | 1 549 206 A | 7/1979 |
| GB | 2 180 436 A | 4/1987 |
| JP | 56-051950 A2 | 5/1981 |
| JP | 58-094361 A2 | 6/1983 |
| JP | 59-166048 A2 | 9/1984 |
| JP | 61-019450 A2 | 1/1986 |
| JP | 61-040776 A2 | 2/1986 |
| JP | 62-166859 | 7/1987 |
| JP | 62-166859 A2 | 7/1987 |

(Continued)

OTHER PUBLICATIONS

Derwent-Week 200619, "Soy Protein Concentrate", Copyright 2010 Derwent Information LTD, Sep. 25, 2003, abstract only.*

(Continued)

*Primary Examiner* — Helen F Pratt
(74) *Attorney, Agent, or Firm* — Fitch, Even, Tabin & Flannery

(57) ABSTRACT

Methods are provided to prepare heat stable soy milk concentrates above 3.2× based on the level of protein that are thermally stable upon achieving an $F_o$ of at least 5. One method removes soluble carbohydrates prior to concentration. Another method removes both soluble and insoluble carbohydrates prior to concentration. Yet other methods prepare soy milk concentrates using partially hydrolyzed soy protein isolate.

16 Claims, 3 Drawing Sheets

FOREIGN PATENT DOCUMENTS

| | | | |
|---|---|---|---|
| JP | 63-202365 | A2 | 8/1988 |
| JP | 03-080058 | | 4/1991 |
| JP | 03-080058 | A2 | 4/1991 |
| JP | 04-036146 | A2 | 2/1992 |
| JP | 06-153841 | A2 | 6/1994 |
| JP | 06-303901 | A2 | 11/1994 |
| JP | 07-115899 | A2 | 5/1995 |
| JP | 09-248150 | A2 | 9/1997 |
| WO | 98/07329 | A1 | 2/1998 |
| WO | 98/44807 | A1 | 10/1998 |
| WO | 99/45799 | A1 | 9/1999 |
| WO | 00/19839 | A1 | 4/2000 |
| WO | 2006/012506 | A1 | 2/2006 |
| WO | 2008/088973 | A3 | 2/2009 |

OTHER PUBLICATIONS

Lalles et al., 1995, "Hydrolyzed Soy Protein Isolate Sustains High Nutritional Performance in Veal Calves", Journal of Dairy Science, vol. 78 No. 1 p. 194-204 (abstract only).*

Choo Whoi Kang, "Soybean Milk Production," J. Korea Assoc. Food Sci., vol. 2, No. 1, 1970, pp. 121-126.

G.M. Wallace and A. Khaleque, "Studies on the Processing and Properties of Soymilk. III. Factors affecting concentration of soymilk and its stability during heat sterilization," J. Sci. Fd Agric., 1971, vol. 22, October, pp. 531-535.

William Shurtleff, "Soymilk at Loma Linda," Soyfoods, The Journal of the Soycrafters Association of North America, vol. 1, No. 4, Winter 1981, pp. 3, 24-26.

Leslie M. Nsofor and Kelechi B. Anyanwu, "Effect of Heat Processing on Refrigerated Shelf-life of Concentrated Soymilk Beverage," Journal of Food Science and Technology, vol. 29, No. 1, 1992, pp. 40-44.

Leslie M. Nsofor et al., "Storage stability of concentrated soymilk: evaluation of cowmilk concentrate and salts' addition and soybean acid-steeping," International Journal of Food Science and Technology, vol. 28, 1993, pp. 499-504.

International Preliminary Report On Patentability of The International Bureau of WIPO for International Application No. PCT/US2008/050484 dated Jul. 14, 2009, 8 pages.

* cited by examiner

METHODS OF FORMING HEAT STABLE SOY MILK CONCENTRATES

FIELD

The invention relates to methods of producing heat stable soy milk concentrates, and in particular, methods of producing heat stable soy milk concentrates at levels greater than about a 3.2× concentration based on protein.

BACKGROUND

The concentration of liquid products is often desired because it allows for reduced volumes to be stored and transported, thereby resulting in decreased storage and shipping costs. Liquid concentrates also permit packaging and use of the liquid products in more efficient ways. For example, with the popularity of on-demand beverage systems, which provide single servings of hot and cold beverages, concentrated forms of beverages are often utilized in a cartridge or pod to provide regular strength beverages when diluted by the beverage system. Concentration of dairy milk is such an example that is typically used with on-demand beverage systems to provide lattes, cappuccinos, and other hot and cold beverages through the dilution of the dairy milk concentrate. There are, of course, other uses for concentrated beverages.

Many consumers, however, prefer soy milk rather than dairy milk. Unfortunately, the techniques to prepare stable, highly concentrated dairy milk do not readily transfer to the formation of stable, highly concentrated soy milk. During concentration, it appears that the protein-protein interactions of the soy protein do not react the same as the protein-protein interactions of the casein and/or whey in dairy milk. Consequently, employing dairy milk concentration techniques to soy milk does not result in highly concentrated soy milks that are stable or organoleptically-pleasing.

Traditional methods of soy milk concentration, on the other hand, result in highly concentrated soy milks that are not stable and/or organoleptically-unpleasing. For example, soy milk is commonly concentrated by using an evaporator under vacuum until the desired concentrate level is achieved. However, such methods generally can not produce a soy milk concentrate that is thermal or shelf stable above about 3 to about 3.2× based on the amount of protein.

When concentrating soy milk above 3.2× based on protein using traditional evaporative methods, the resultant product has a tendency to undergo protein gelation or exhibit protein precipitation upon sterilizing (i.e., high temperature processing and the like) or during an extended shelf life. For example, when subjected to retort heat treatment conditions (i.e., about 121° C. or higher), soy milk that has been concentrated above about 3.2× based on protein using standard evaporative techniques tends to exhibit soy protein aggregation forming a network gel or a portion of the soy protein precipitates out of solution. These undesired effects upon heat treatment render it difficult to dilute the concentrated soy milk back to a single strength beverage. Additionally, consumers would find such product visually and esthetically unappealing.

Processing aids, such as sugars, are often employed with dairy concentrates to help solubilize protein and provide a stable concentration. Use of such processing aids in concentrated soy milk, however, has been met with limited success. For example, Japanese Patent No. 7-115899 utilizes sugar to stabilize soy milk and allows production of a soy concentrate having total solids of about 29.5 percent with a ratio of soy solids to sugar ranging from 1:0.5 to 1:1.5. However, due to the added sugar, the level of soy solids and protein in the concentrated soy milk is limited to less than about a 2.5× to a 2.9× concentration.

Other methods to process soy milk using heat treatments are known, but generally do not encounter the above described stability problems because these methods either do not concentrate, provide soy in a powdered form, or remove portions of the soy protein from the final product. For example, Japanese Patent Nos. 56051950 and 61040776 and U.S. Pat. No. 6,103,282 disclose methods of processing and heat treating soy milk, but do not concentrate the soy milk prior to the heat treatment. Japanese Patent Nos. 06153841, 62166859, and 06303901 and International Publication No. 98/07329 provide powdered soy milk rather than concentrated liquid soy milk. A soy beverage prepared from powdered soy milk will generally result in a less satisfactory beverage and can result in a grainy product if agglomerates are formed during reconstitution. Japanese Patent Nos. 59166048 and 62166859 disclose methods of making concentrated soy milk but do so by providing a soy milk product with decreased levels of protein.

Accordingly, there remains a need for a method of concentrating soy milk above 3.2× level to provide a product that is stable under heat treatment and has an extended shelf life. The present invention provides such needs.

SUMMARY

Methods are provided to prepare soy milk concentrates above 3.2× based on the level of protein that are thermally stable under typical thermal treatments. In various forms, the methods herein provide heat stable soy milk concentrates having above 3.2×, preferably above about 3.5×, and more preferably about 3.5× to about 5.5× based on the level of protein. One method removes soluble carbohydrates and, preferably, both soluble and insoluble carbohydrates from soy milk prior to concentration. Other methods use partially hydrolyzed soy protein isolates. The methods herein provide soy milk concentrates that are heat stable at an $F_o$ of at least 5, preferably, an $F_o$ of at least 10, and even more preferably, an $F_o$ of at least 12.

In one embodiment, a method is provided to prepare heat stable soy milk concentrates having between about 9.9 and about 10.8 percent protein (i.e., about 3.3× to about 3.6×) with a pourable and flowable viscosity. For purposes herein, all viscosity information was measured or observed at ambient temperature of about 25° C. The resultant concentrate is stable upon experiencing heat treatment to achieve an $F_o$ of at least 5, preferably an $F_o$ of 10, and most preferably an $F_o$ of 12. For example, the concentrate is stable upon experiencing heat treatment up to 123° C. for about 8 minutes (i.e., about $F_o$ of 10) and other thermal treatments to achieve such $F_o$ values. The heat stable soy milk concentrate is prepared, at a minimum, by first removing about 70 to about 99 percent of the soluble carbohydrates from soy milk using an ultrafiltration membrane to form an intermediate soy milk having between about 5 and about 15 percent total solids. Next, the intermediate soy milk is concentrated, preferably by evaporation, to the desired soy protein level to form the heat stable soy milk concentrate. In one approach, additional processing aids or stabilizers are not used to form the stable concentrates. As a result, all of the solids in the resultant concentrate are preferably soy solids. However, if desired other processing aids, sweeteners, flavors, additives, or ingredients may also be used depending on the use or application of the soy milk concentrate or to improve flavor, mouthfeel, or other organoleptic properties.

Preferably, portions of both the soluble and insoluble carbohydrates are removed from soy milk prior to evaporation. Thus, in another method about 70 to about 99 percent of the soluble carbohydrates are removed from soy milk using an ultrafiltration membrane, and about 70 to about 99 percent of the insoluble carbohydrates are removed from the soy milk using centrifugal techniques and/or filtration techniques. Whether centrifugal or filtration techniques are employed will generally depend on the particle size of the insolubles and total amount. For example, the particle size will determine the mesh size of the filter. For high insoluble levels, filtration will generally not be as efficient as centrifugation because of potential filter clogging, and washing. This additional pre-treatment prior to concentration permits the formation of a heat stable soy milk concentrate with between about 10 and about 10.8 percent protein (i.e., about 3.4× to about 3.6×).

In another embodiment, a heat stable soy milk concentrate is prepared by using partially hydrolyzed soy protein isolate (generally with a degree of hydrolysis to produce a molecular weight distribution between 4,000 and 40,000 dalton and preferably between 5,500 and 30,000 dalton). For example, a method is provided that disperses about 6 to about 13 percent hydrolyzed soy protein isolate having a molecular weight distribution between 5,500 and 30,000 dalton into soy milk to form a soy milk dispersion. Then, the soy milk dispersion is homogenized to form the heat stable soy milk concentrate. Using this method, a heat stable soy milk concentrate may be formed that has up to about 16.5 percent protein (about 5.5×), and preferably between about 12 and about 15 percent protein (i.e., about 4× to about 5×). Generally, the viscosity of such concentrates are about 15 to about 200 cps. Preferably, this method also does not incorporate processing aids or stabilizers to achieve such a stable concentrate; therefore, all of the solids in the resultant heat stable soy milk concentrate are preferably soy solids. However, other processing aids, stabilizers, salts, sweeteners, flavors, or other ingredients may also be used. Optionally, the initial soy milk provided for this method may also be pre-concentrated by evaporation (and, optionally, removal of the soluble and/or insoluble carbohydrates as described above).

In another embodiment, a heat stable soy milk concentrate is prepared by pre-dispersing partially hydrolyzed soy protein isolate into an edible oil and then dispersing the oil/soy isolate mixture in water to form a pre-emulsion, which may be homogenized to form the soy concentrate. For example, this method disperses about 15 to about 20 percent hydrolyzed soy protein isolate having molecular weight distribution between 5,500 and 30,000 dalton, about 65 to about 75 percent water, and about 5 to about 15 percent of an edible oil to prepare a soy protein emulsion. Then, the soy protein emulsion is homogenized to form the heat stable soy milk concentrate. Using this method, the heat stable soy milk concentrate has up to about 16.5 percent protein (i.e., about 5.5×) and preferably about 12 to about 15 percent protein (i.e., about 4× to about 5×) and a viscosity of about 50 to about 500 cps. The oil can either be dairy oil or vegetable oil. Preferably, the oil is anhydrous milk fat, high oleic canola oil, soy bean oil, coconut palm kernel oil, or mixtures thereof. Most preferably, the oil is either anhydrous milk fat or high oleic canola oil. If desired, other processing aids, stabilizers, salts, sweeteners, flavors, emulsifiers, or other ingredients may also be used to improve stability, creaming, mouthfeel, and/or flavors as desired.

DETAILED DESCRIPTION

Figure 1:
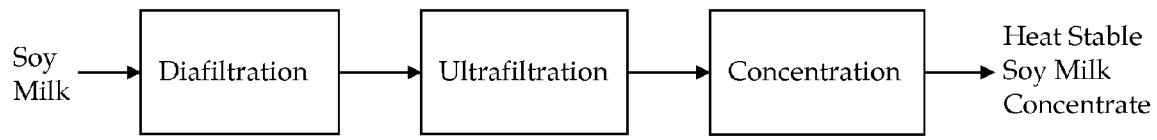
FIG. 1 is a flowchart of an exemplary process to provide heat stable concentrated soy milk.

Methods are provided to form soy milk concentrates above about 3.2× based on the level of protein that are stable upon heat treatment and have an extended shelf life. In various forms, the methods herein provide a heat and shelf stable soy milk concentrate greater than 3.2×, preferably above about 3.5×, and more preferably about 3.5× to about 5.5× based on the level of protein. The concentrated soy milks are suitable for use with optional flavors, sweeteners, and other ingredients to provide a concentrated soy milk product that can be diluted hot or cold to form a soy milk beverage or other product having an acceptable taste, mouthfeel, and with no significant off flavors or colors. Depending on the particular method used, the resultant heat stable soy milk concentrates have at least about 9.9 and up to about 15 percent or more protein and it is estimated to have a generally pourable viscosity between about 10 and about 4000 cps. The soy milk concentrates formed by the methods herein are also stable under thermal processing to achieve an $F_o$ of at least 5, preferably an $F_o$ of at least 10, and most preferably, an $F_o$ of at least 12.

As discussed above, the methods provide a soy milk concentrate greater than 3.2× (preferably greater than 3.5× and even more preferably about 3.5× to 5.5×) that is stable upon heat treatment and has an extended shelf life. For purposes herein, the concentration factor is based on the level of soy protein and is calculated by dividing the final soy protein amount by the amount of soy protein in a 1× sample. For purposes herein, a 1× sample is about 3 percent protein. For example, a soy concentrate with 12 percent soy protein is a 4× concentrate.

"Heat treatment" or "thermal treatment" shall be understood to include thermal treatments sufficient to achieve an $F_o$ of at least 5, preferably an $F_o$ of at least 10, and most preferably, an $F_o$ of at least 12. For example, heat treatment can include up to retort conditions of about 121-123° C. for up to about 8 minutes (i.e., an $F_o$ of about 10) as well as other thermal treatments to achieve the desired $F_o$ value.

The level of heat or thermal treatment of a food or beverage is often characterized by a lethality or sterilization value ($F_o$). The $F_o$ for a particular sterilization process (i.e., pasteurization, UHT, retort, and the like) can be measured using graphical integration of time-temperature data during the food or beverage's slowest heating point rate curve for the thermal process. This graphical integration obtains the total lethality provided to the product. To calculate the processing time required to achieve a desired $F_o$ using the graphical method, a heat penetration curve (i.e., a graphical plot of temperature versus time) at the slowest heating location of the food is required. The heating plots are then subdivided into small time increments and the arithmetic mean temperature for each time increment is calculated and used to determine lethality (L) for each mean temperature using the formula:

$$L = 10(T-121)/z$$

Where:
T=arithmetic mean temperature for a small time increment in ° C.;
z=standardized value for the particular microorganism; and
L=lethality of a particular micro-organism at temperature T.

Next, the lethality value calculated above for each small time increment is multiplied by the time increment and then summed to obtain the sterilization value ($F_o$) using the formula:

$$F_o = (t_{T1})(L_1) + (t_{T2})(L_2) + (t_{T3})(L_3) + \ldots$$

Where:
$t_{T1}, t_{T2}, \ldots$ =Time increment at temperature T1, T2, ...;
$L_1, L_2, \ldots$ =Lethality value for time increment 1, time increment 2, ...; and
$F_o$=Sterilization value at 121° C. of a microorganism.

Consequently, once a penetration curve is generated, the sterilization value $F_o$ for the process can by computed by converting the length of process time at any temperature to an equivalent process time at a reference temperature of 121° C. (250° F.). See, e.g., Jay, "High Temperature Food Preservation and Characteristics of Thermophilic Microorganisms," Modern Food Microbiology (D. R. Heldman, ed.), ch. 16, New York, Aspen Publishers (1998).

"Shelf life" means the period of time at which a soy product can be stored at 70° F. without developing an objectionable organoleptic characteristic, such as an objectionable aroma, appearance, taste, consistency, or mouthfeel. In addition, an organoleptically acceptable soy product at a given shelf life will have no significant off-odor, off-flavor, or off-coloring, will not have a clumped, ropy, or slippery texture, and will remain ungelled. "Stable" or "shelf-stable" also means that the soy product at a given time does not have objectionable organoleptic characteristics as defined above and is organoleptically acceptable. "Stable" shall also be understood to include a concentrate that does not form protein gels or have protein precipitation during heat treatment or upon an extended shelf life. "Shelf life" or "extended shelf life" shall be understood to include at least about 12 months of storage, and preferably, about 9 to about 18 months of storage in which the soy milk concentrate is stable as defined above.

"Soy milk" as used herein in an un-concentrated form shall be understood to include a soy beverage prepared from soybeans that have been soaked in water, ground into a fine particle size, and strained to produce a fluid beverage having about 2.5 to about 3.5 percent soy protein, about 5.5 to about 7.5 percent soy solids, and about 1 to about 2.5 percent fat.

In one form, methods are provided to remove at least a portion of the soluble carbohydrates from soy milk prior to concentration (preferably by evaporation) to a desired protein level. In another form, the methods also remove at least a portion of the insoluble carbohydrates from the soy milk prior to concentration. While not wishing to be limited by theory, it is believed that the carbohydrates dilute the soy proteins within the soy milk concentrate and contribute, in a large part, to the overall viscosity of the resultant concentrate. It has been observed that as the overall soy milk viscosity increases, the soy concentrate is less stable to heat treatment. It is believed that heat treatment creates a cross-link of protein molecules that results in aggregation of protein. If the protein concentration is too high, the aggregation results in gelation and the concentrated soy milk gels.

Again not wishing to be limited by theory, it is further believed that this gelling effect of the proteins during high temperature processing is accelerated due to decreases in water availability in concentrates with higher viscosities (such as pudding-like or custard-like consistencies). The decrease in water availability (i.e., free water) of high viscosity concentrates is most likely due to the presence of water binding agents, such as thickeners and other solids, such as proteins and carbohydrates. It is also believed that the decrease in free water enables any denatured proteins to have a higher probability of contacting each other and form protein networks that result in protein aggregation. On the other hand, it is believed that lower viscosity concentrates (such as water-like and pourable salad dressing-like consistencies) that have higher amounts of free water minimize the contact between any denatured proteins resulting in less protein aggregation. Therefore, removing the soluble carbohydrates, and preferably both the soluble and insoluble carbohydrates, forms a concentrated soy product having higher levels of soy protein, a lower viscosity, and a general increase in water availability that renders the product more stable to heat treatment.

In yet another form, methods are provided to blend partially hydrolyzed soy protein isolate into soy milk or edible oils in order to form the desired soy milk concentrate. For purposes herein, partially hydrolyzed means a molecular weight distribution between about 4,000 and about 40,000 dalton, and preferably a molecular weight distribution between about 5,500 and about 30,000 dalton. For purposes herein, it is expected that up to about 95 percent, preferably about 99 percent, and more preferably about 99.9 percent of the molecular weight distribution falls within these ranges. Again while not wishing to be limited by theory, it is believed that partial hydrolysis of the soy protein increases the solubility of the protein so that higher amounts of soy protein can be more stably concentrated in a lower viscosity concentrate. It is believed that hydrolysis breaks the protein down to smaller polypeptides that have an increased surface area, which can then get hydrated more easily and, thus, become very soluble. It has been observed that the level of hydrolysis of the soy protein has an effect on both the stability and the organoleptic properties of the resultant soy milk concentrate. Partial hydrolysis (i.e., molecular weight distribution between about 5,500 and about 30,000 dalton) of the soy protein is preferred because it lowers the molecular weight of the protein so that the overall viscosity of the concentrated product is lower and does not impart any unwanted organoleptic characteristics to the resulting concentrate. For example, it has been observed that soy milk concentrates using non-hydrolyzed soy protein isolates quickly gel upon heat treatment or are too thick to homogenize and retort. On the other hand, it has also been observed that extensively hydrolyzed soy protein (i.e., molecular weight smaller than about 5,000 dalton) exhibits good stability to heat treatment, but tend to form a product with unacceptable characteristics, such as bitter off tastes or provide foam with unacceptably large air cells when used in a latte or similar beverage. For example, a comparative concentrated soy milk made using Versa Whip™ (Quest International) that had a molecular weight distribution smaller than about 5,000 dalton exhibited off flavors and poor foam quality.

Referring to FIG. 1, an exemplary method of forming a heat stable soy milk concentrate is illustrated. In this method, at least a portion of the soluble carbohydrates in the soy milk are removed prior to concentration. First, at least a portion of the soluble carbohydrates (such as soluble sugars like sucrose, stachyose, raffinose, or the like) are removed from soy milk using an ultrafiltration membrane with diafiltration techniques. (Ultrafiltration may also be used without diafiltration, but it is generally undesired because it would not be as efficient in removing carbohydrates, and the viscosity would become a limiting factor to wash the soluble carbohydrates into the permeate.) Preferably, the ultrafiltration membrane removes about 10 to about 100 percent of the soluble carbohydrates using a membrane having a MWCO (molecular weight cut off) greater than 1,000, and preferably about 1,000 to about 50,000. After diafiltration, the soy milk is ultrafiltered to form a soluble-carbohydrate-reduced retentate (intermediate soy milk) having about 5 to about 15 percent total solids. Then, this soluble-carbohydrate-reduced retentate is concentrated to a desired protein level, preferably by evaporation, to form the heat stable soy milk concentrate. For example, the soy milk may be evaporated using a rotary evaporator or other commercially available evaporator at about 50° C. and a vacuum of about 30-40 torr (about 0.6-0.8 psi) to the desired concentration level. Alternatively, the soy milk may be concentrated through use of the UF membrane. For example, a tubular-type UF membrane may be employed to remove carbohydrates and concentrate to the desired levels. Using a UF membrane to remove solids and concentrate may be advantageous because it limits the thermal exposure to the soy milk.

In general, the method of FIG. 1 is suitable to form a soy milk concentrate that is stable under retort conditions up to about 3.5× (preferably about 3.3× to about 3.5×). These concentrates preferably have between about 18 and about 19 percent total solids, between about 18 and about 19 percent soy solids, and between about 9.9 and about 10.5 percent protein. The concentrates also generally have a pourable viscosity. It is preferred that no processing aids and/or stabilizers are employed prior to or after evaporation of the soy milk to achieve such levels of stable concentrates. That is, all of the solids in the concentrate are preferably soy solids.

If desired, however, processing aids or other additives may also be used. For example, sugar, salt, sodium citrate, other known processing aids, flavors, additives, sweeteners, or other ingredients may also be added to the concentrate before or after evaporation. For example, about 7 to about 20 percent sugar may be added or about 0.1 to about 0.6 percent salt may be added to the concentrate after evaporation. Such optional ingredients may be added to improve stability, provide additional sensory benefits (i.e., mouthfeel), and may reduce settling of insoluble solids by providing a viscosity increase.

Figure 2:
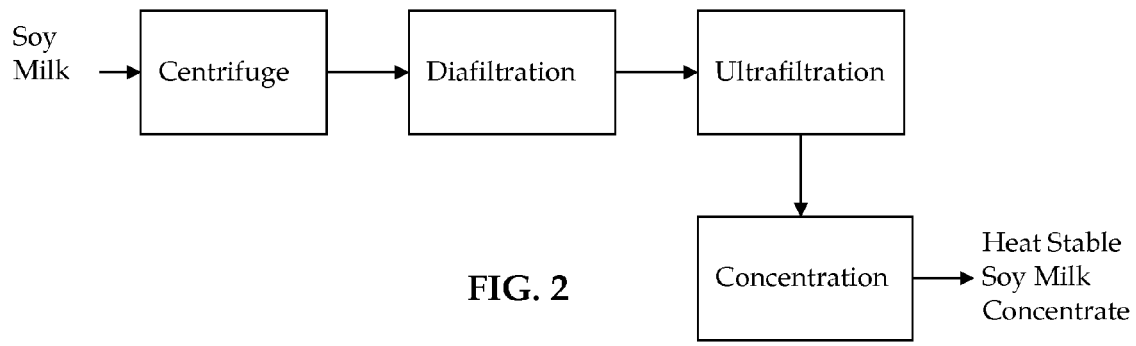
FIG. 2 is a flowchart of another exemplary process to provide heat stable concentrated soy milk.

Referring to FIG. 2, another exemplary method of forming a heat stable soy milk concentrate is illustrated. In this method, a portion of both the soluble carbohydrates and insoluble carbohydrates (such as insoluble fibers, cellulostic materials, and the like) are removed from soy milk prior to evaporation. In this embodiment, about 70 to about 99 percent of the insoluble carbohydrates are first removed from the soy milk using centrifugal forces to form an insoluble carbohydrate reduced supernatant (i.e., the liquid overlying the material deposited by the centrifugal forces). Preferably, the soy milk is centrifuged in a batch-type centrifuge or continuous-type centrifuge at about 500 to about 20,000 G for about 20 minutes or with multiple passes (as needed) in continuous process to separate the insoluble carbohydrates. Alternatively, filtration methods may also be used to separate the insoluble carbohydrates. Next, about 70 to about 99 percent of the soluble carbohydrates are removed from the supernatant using the diafiltration and ultrafiltration techniques described above with FIG. 1. (Alternatively, the soy milk may be filtered prior to centrifuging.) Then, the soluble and insoluble carbohydrate reduced product is recovered and concentrated to a desired protein level, preferably by evaporation, to form the heat stable concentrated soy milk. Again, the soy milk may be evaporated using a rotary evaporator or other commercially available evaporator at about 50° C. and a vacuum of about 30-40 torr (about 0.6-0.8 psi) to the desired concentration level. Alternatively, the soy milk may be concentrated using a UF membrane.

In general, the method of FIG. 2 is suitable to form a soy milk concentrate that is stable under retort conditions up to about 3.6×, have up to about 10.8 percent protein, and a generally pourable viscosity. It is also preferred that no processing aids or other stabilizers are employed prior to or after the evaporation to achieve such levels of stable concentrates. That is, all solids in the resulting concentrate are preferably soy solids.

If desired, however, processing aids or other ingredients may also be used with this method. Similar to the method of FIG. 1, sugar, salt, sodium citrate, other known processing aids, flavors, additives, sweeteners, or other ingredients may also be used in the method of FIG. 2. For example, about 12 to about 18 percent sugar, about 0.1 percent to about 0.5 percent salt, about 0.2 percent to about 0.6 percent sodium citrate, and/or about 0.01 percent to about 0.1 percent artificial sweetener (e.g., Splenda (sucralose)) may be added to the concentrate after evaporation.

Figure 3:
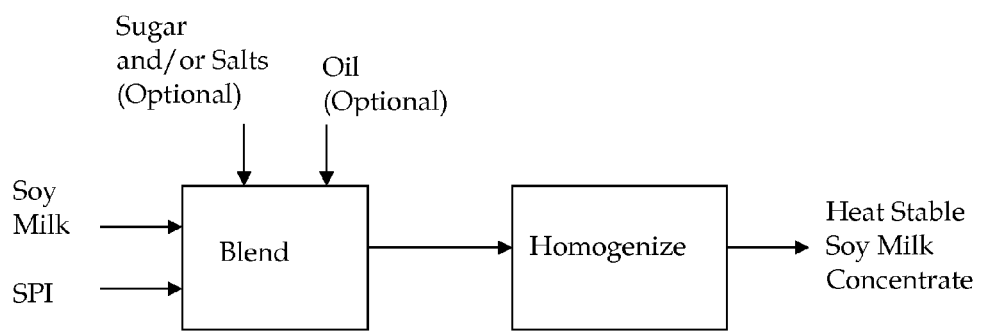
FIG. 3 is a flowchart of another exemplary process to provide heat stable concentrated soy milk.

Referring to FIG. 3, another exemplary method of forming a heat stable soy milk concentrate is illustrated. In this method, about 9 to about 13 percent partially hydrolyzed soy protein isolate is hydrated in soy milk to form a soy milk concentrate. Preferably, the partially hydrolyzed soy protein isolate has a molecular weight distribution between about 5,500 and about 30,000 dalton. Below this level of hydrolysis (i.e., below about 5,000 dalton), the resultant concentrates generally do not exhibit stability to the heat treatments, and above this level of hydrolysis, the resultant concentrates and/or their diluted beverages can exhibit undesired organoleptic characteristics, such as a bitter taste and/or unacceptable foam when used to make lattes or cappuccinos. The formed soy milk dispersion is then homogenized, preferably using a two-stage homogenizer at about 5000/500 psi, along with optional ingredients such as fats (i.e., soy bean oil and/or other edible oils), emulsifiers (i.e., monodiglyceride, polysorbate 80/60, sorbitan monostearate, sorbitan monooleate and the like), stabilizers (i.e., gellan, carageenan, microcrystalline cellulose, and the like), salts (i.e., sodium chloride, tri-sodium citrate, mono- and di-sodium phosphate and the like) and/or sugars to form the heat stable soy milk concentrate.

In general, the method of FIG. 3 is suitable to form a soy milk concentrate that is stable under retort conditions up to about 5× (preferably about 4× to about 5×). These concentrates preferably have between about 20 to about 23 percent total solids, between about 20 and about 23 percent soy solids, and between about 12 and about 15 percent protein. These concentrates also preferably have a generally pourable viscosity. Concentrates at the upper end of the range are thicker, but are still flowable and acceptable. Similar to the other embodiments, it is preferred that no processing aids or other stabilizers are employed prior to or after evaporation to achieve such levels of stable concentrates. That is, the total solids in the soy milk concentrate formed from the method of FIG. 3 are preferably soy solids.

If desired, however, optional ingredients may also be added to enhance the stability, flavor, mouthfeel, creaminess, or other organoleptic properties of the concentrate or subsequently diluted beverage. For example, fats, oils, emulsifiers, stabilizers, salts, and/or sugars may be blended into the dispersion as needed.

For example, the following optional ingredients may also be blended into the soy concentrate. About 7 to about 20 percent sugar may be added to enhance the flavor of the concentrate. About 5 to about 9 percent edible oil/fat (preferably soybean oil) may also be added to improve the mouthfeel and creaminess as well as to enhance the foamability (i.e., increase the foam stability generally due to higher viscosity) of the concentrate if used to prepare lattes or cappuccinos. About 0.25 to about 0.5 percent sodium chloride and/or about 0.3 percent tri-sodium phosphate may also be added to the concentrate to improve stability, mouthfeel, and creaminess. For example, it has been observed that about 0.5 percent of sodium chloride may be added to a soy concentrate having about 8-12 percent protein (from a soy protein isolate) to provided increased resistance to creaming and sedimentation for up to at least about 20 weeks. About 0.1 to about 0.3 percent of mono- and/or di-sodium phosphate may also be added for stability. For example, it has also been observed that addition of about 0.3% mono-sodium phosphate to a soy concentrate having between about 8 and 12 percent protein (from a soy protein isolate) has increased the stability of a soy concentrate for up to at least about 20 weeks.

The inclusion of some stabilizers and thickeners, however, such as Xanthan gum, modified starch, gum Arabic, and carboxy methyl cellulose, provided unacceptable results. Soy concentrates using partially hydrolyzed soy protein, when blended with such stabilizers and thickeners, generally resulted in unacceptable product due to formation of a cream layer, undesired viscosity increase, and/or precipitation of proteins out of solution after heat treatment.

Figure 4:
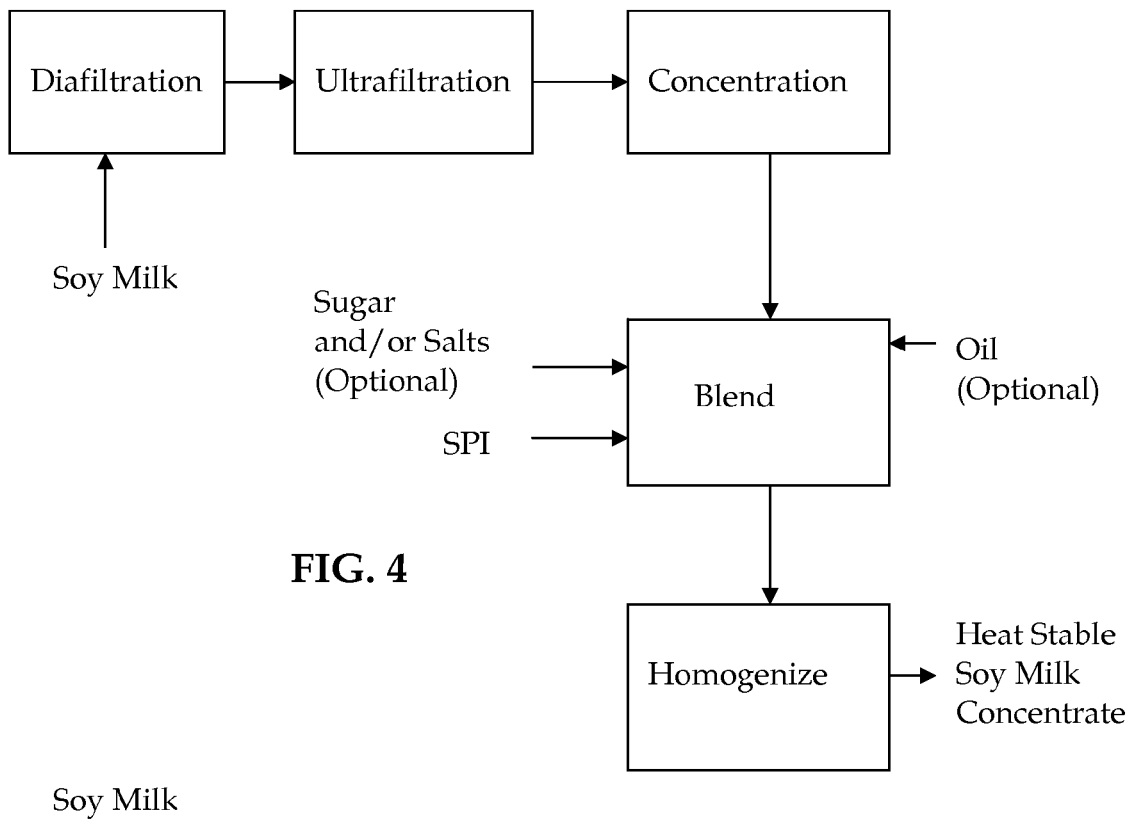
FIG. 4 is a flowchart of another exemplary process to provide heat stable concentrated soy milk.
Figure 5:
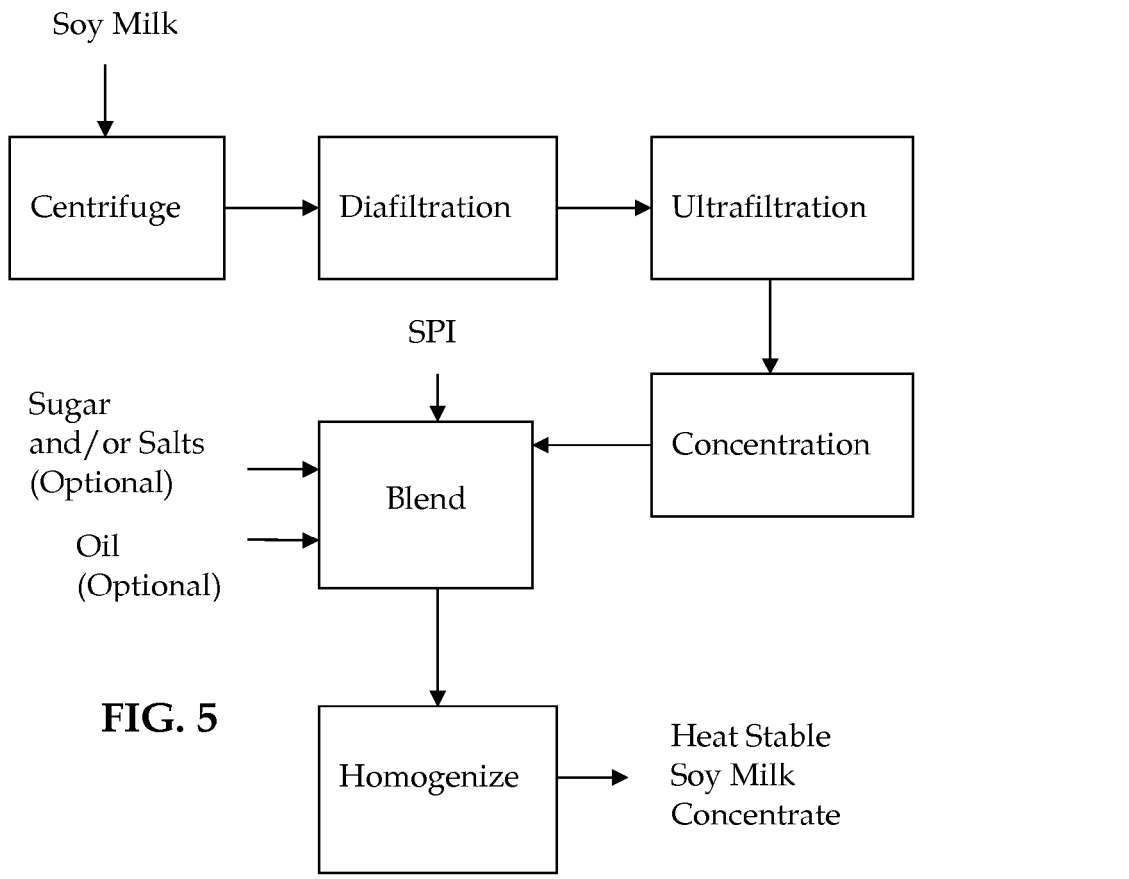
FIG. 5 is a flowchart of another exemplary process to provide heat stable concentrated soy milk.

As shown in FIGS. 4 and 5, the partially hydrolyzed soy protein isolate may also be dispersed in previously concentrated soy milk. For example, soy milk may first be concentrated using either the methods of FIG. 1 or FIG. 2 or other suitable concentration techniques. The partially hydrolyzed soy protein isolate is then blended into the concentrated soy milk and homogenized in a manner similar to that described above. Using previously concentrated soy milk, the methods are suitable to form soy milk concentrate that is stable upon retort conditions and, preferably, without processing aids up to about 4× preferably having up to about 17 percent total solids, up to about 17 percent soy solids, and up to about 12 percent protein with a viscosity of about 1,300 cps. Similar to the other embodiments, it is preferred that no processing aids or stabilizers are employed prior to or after evaporation to achieve such levels of stable concentrates in the methods of FIGS. 4 and 5. That is, the total solids in the soy milk concentrates formed from the methods of FIGS. 4 and 5 are also preferably soy solids. However, as with the other embodiments, optional ingredients, such as, but not limited to, sugar, salt, sodium citrate, other known processing aids, flavors, additives, sweeteners, or other ingredients may also be added as needed.

Figure 6:
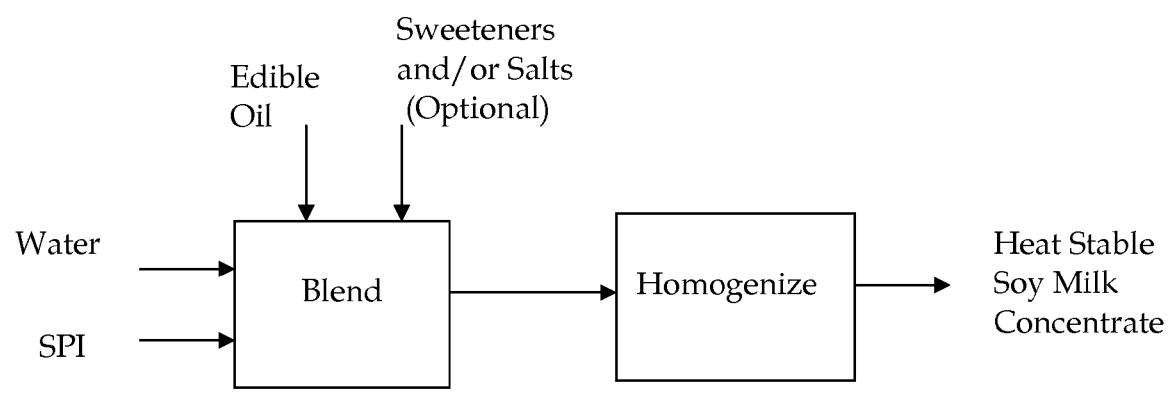
FIG. 6 is a flowchart of another exemplary process to provide heat stable concentrated soy milk.

Referring to FIG. 6, another exemplary method of forming a heat stable soy milk concentrate is illustrated. In this method, about 15 to about 20 percent partially hydrolyzed soy protein isolate is dispersed in an edible oil and water to form a pre-emulsion. Similar to the previous embodiment, the partially hydrolyzed soy protein isolate preferably has a molecular weight distribution between about 5,500 and about 30,000 dalton. Hydrolysis below this level does not produce concentrated soy milk with sufficient stability, and above this level produces soy milk with off-flavors. The formed pre-emulsion is then homogenized using two-stage homogenizer at 5000/500 psi to form the heat stable soy milk concentrate.

The edible oil can be any dairy or vegetable oil such as, but not limited to, anhydrous milk fat, high oleic canola oil, soybean oil, coconut palm kernel oil, and the like. It is preferred that the oil is an anhydrous milk fat because it improves the taste of the soy milk beverage by making it closer to a dairy milk taste, which may be important for non-soy milk drinkers. In addition, high oleic canola is also preferred over soybean oil because the oleic fatty acids in the canola oil are less prone to oxidation than the polyunsaturated oil in the soybean oil. The coconut palm kernel oil may render the soy milk slightly bitter, but addition of optional sweeteners, such as about 7 to about 15 percent sugar, would provide a more pleasing taste.

In general, the method of FIG. 6 is suitable to form soy milk concentrate that is stable under retort conditions and, preferably, without the use of other processing aids up to about 5× having up to about 28.5 percent total solids, up to about 19.5 percent soy solids, and up to about 15 percent protein with a viscosity of about 450 cps. However, as with the other methods, optional processing aids, stabilizers, fats, oils, emulsifiers, salts, sugars, flavors, sweeteners, and/or other ingredients may also be added if desired for affect stability, mouthfeel, flavor, and/or other organoleptic properties of the soy milk concentration and/or the resultant diluted soy milk.

By one approach, it is expected that the heat stable soy milk concentrates produced by the methods herein are sufficiently stable such that they may be used in cartridges or pods designed for on-demand beverage preparation machines, such as those described in U.S. patent application Ser. No. 10/763,680 (filed Jan. 23, 2004), which is hereby incorporated herein by reference in its entirety. Of course, the heat stable soy milk concentrates described herein can also be used for many other purposes and/or used in many other applications.

The Examples that follow are intended to illustrate, and not to limit, the invention. All percentages used herein are by weight, unless otherwise indicated. All references cited herein are hereby incorporated by reference.

EXAMPLES

Comparative Example 1

Partially concentrated soy milk (Sun Rich Company, Minnesota) provided in aseptic packaging at 13 percent solids was used to prepare various concentrations of soy milk. The soy milk was concentrated using a rotary evaporator at 50° C. and at a vacuum of about 30-40 torr (about 0.6-0.8 psi). To concentrate, about 1500 grams of soy milk were loaded into a round flask, and then concentrated to various solids levels using the evaporator. The target solids were verified using a microwave moisture analyzer (Buechi, Switzerland).

Once the target solid level was achieved, the samples were poured into glass bottles with metal screw caps. Each sample bottle was loaded with 200 g of concentrated soy milk, and then retorted on a Surdry retort machine (APR-95-IF type) under the following conditions: operating mode: steam/water spray; rotation: full rotation at 5 rpm; cycle time: 32 minutes; temperature: 123° C. with a total time at temperature of 8 minutes. After retorting, each sample was evaluated for stability. The results are provided in Table 1 below:

TABLE 1

| Sample | Additives | Total Solids, % | Soy Solids, % | Protein, % | Viscosity Description | X Factor | Effect of Retort |
|---|---|---|---|---|---|---|---|
| 1 | None | 13 | 13 | 5.9 | Slightly thicker than water | 2 | Good, no gelling |
| 2 | None | 20 | 20 | 9.0 | Pourable salad dressing-like | 3.0 | Good, no gelling |
| 3 | None | 21 | 21 | 9.5 | Pourable salad dressing-like | 3.2 | Good, no gelling |
| 4 | None | 22 | 22 | 9.9 | Close to pudding consistency | 3.3 | Borderline, would be unacceptable after long shelf life |
| 5 | None | 22.5 | 22.5 | 10.1 | Custard-like | 3.4 | Gelled |
| 6 | None | 24 | 24 | 10.8 | Custard-like | 3.6 | Gelled |
| 7 | 0.4% Salt, 0.6% Sodium Citrate | 25 | 24 | 10.8 | Custard-like with visual particulate | 3.6 | Gelled, visual specs |
| 8 | None | 25.9 | 25.9 | 11.7 | Custard-like with visual particulate | 3.9 | Gelled, precipitate |

The above results show that the preparation of retort stable liquid soy milk up to about 3.2× can be achieved using only evaporation. Above these levels, the soy milk concentrate is unstable upon retorting, and the protein gelled or precipitated out of solution.

Example 2

This example demonstrated the effect of preparing concentrated soy milk with a pre-treatment intended to remove at least a portion of the soluble carbohydrates from soy milk using an ultrafiltration membrane prior to evaporation. Removal of soluble carbohydrates increases the protein level in the milk on a solid basis from 45 to 55 percent.

To pretreat the soy milk, about 200 pounds of raw soy milk (Sun Rich Company, Minnesota) at about 13 percent total solids was diluted with 100 pounds of R.O. water in a jacketed mixing tank to prepare the soy milk at a viscosity suitable for ultrafiltration treatments. The temperature of mixture was maintained at about 120° F. for the duration of the ultrafiltration treatment. The pH of the soy milk was adjusted to 10 using 1N NaOH. The soy milk was first diafiltered (MWCO of 10,000 dalton) to an equivalence of 5 washes to remove greater than 90 percent of the soluble carbohydrates. Each wash was equal to about half of the starting batch (about 150 pounds of permeate). After diafiltration was complete, the pH was neutralized to 6.5, and then the soy milk was ultrafiltered to a concentration of about 12 percent total solids. The concentrated soy milk was then collected in a separate tank and batch pasteurized at 185° F. for about 2 minutes. It was cooled down and then refrigerated for further use.

To further concentrate the soy milk, samples from the ultrafiltered and pre-treated soy milk were concentrated using the rotary evaporator as in Example 1. Concentrated samples were filled in glass bottles and retorted using the same procedure as in Example 1. After retorting, each sample was evaluated for stability. Results are provided below in Table 2.

TABLE 2

| Sample | Additives | Total Solids, % | Soy Solids, % | Proteins, % | Viscosity Description | X Factor | Effect of Retort |
|---|---|---|---|---|---|---|---|
| 1 | None | 18 | 18 | 9.9 | Pourable dressing consistency | 3.3 | Good, no gelling |
| 2 | 12% Sugar | 30 | 18 | 8.8 | Pourable dressing consistency | 2.9 | Excellent, no gelling |
| 3 | 18% Sugar | 36 | 18 | 8.3 | Pourable dressing consistency | 2.8 | Excellent, no gelling |
| 4 | 0.4% Salt, 12% Sugar | 30.4 | 18 | 9.9 | Between pudding and pourable dressing consistency | 3.3 | Good, higher viscosity |
| 5 | None | 19 | 19 | 10.5 | Pourable dressing consistency | 3.5 | Good, no gelling |
| 6 | 12% Sugar | 31 | 19 | 9.3 | Pourable dressing consistency | 3.1 | Good, no gelling |
| 7 | None | 20 | 20 | 11.0 | Between pudding and custard consistency | 3.7 | Borderline, unacceptable at extended shelf life |
| 8 | None | 21 | 21 | 11.6 | Custard-like | 3.9 | Gelled |

Example 3

This example demonstrates the formulation of concentrated soy milk using additional flavors and sweeteners. Soy milk was concentrated as in Example 2 to about 18 percent total solids or about 3.3×. Then, sweeteners and flavors were added as summarized in Table 3; however, the amount of flavors (peach, vanilla, fruit, etc.) can vary based on the flavor concentration being supplied.

TABLE 3

| Description | Amount of 3.3X Soy Milk | Amount Sweetener | Amount Flavor |
|---|---|---|---|
| Plain Soy Milk | 18% | 12% Sugar | |
| Plain Soy Milk | 18% | 18% Sugar | |
| Vanilla Soy Milk | 18% | 18% Sugar | 2% Vanilla flavor |
| Peach Soy Milk | 18% | 18% Sugar | 1.4% Peach flavor |

After retorting as in Example 1, the concentrates of Table 3 were diluted to 1× using cold water and then sensory evaluated. The products of Table 3 were evaluated by a panel of taste testers. The soy milks were reported as being excellent, having a good mouthfeel, exhibiting no off flavors, and were very refreshing.

In a similar manner, all concentrates were diluted with hot water using an on-demand beverage preparation machine (Tassimo™, Kraft Foods), and were also diluted by adding hot water directly into a cup, and spoon mixed. The dilution ratio was about 1:2. These hot soy milk beverages were well accepted by a panel of taste testers.

Example 4

This example demonstrated the effect of preparing concentrated soy milk with a pre-treatment intended to remove at least a portion of both the soluble carbohydrates and the insoluble carbohydrates from the soy milk using an ultrafiltration membrane and centrifugation prior to concentration via evaporation.

Soy milk that was ultrafiltered in the manner of Example 2 was centrifuged prior to concentration. Samples were spun at 8,200 G for 20 minutes to remove insoluble fibers in a batch type centrifuge (Beckman Coulter). After centrifugation, the supernatant was decanted and then concentrated and retorted per the procedures of Example 1. After retorting, each sample was evaluated for stability. The results are shown in Table 4.

TABLE 4

| Sample | Additives | Total Solids, % | Soy Solids, % | Proteins, % | Viscosity Description | X Factor | Effect of Retort |
|---|---|---|---|---|---|---|---|
| 1 | None | 19 | 19 | 11.4 | Custard-like | 3.8 | Gelled |
| 2 | 12% Sugar | 31 | 19 | 10.2 | Pourable salad dressing consistency | 3.4 | Good, no gelling |
| 3 | 0.05 g Splenda | 19 | 19 | 11.4 | Custard-like | 3.8 | Gelled |
| 4 | None | 18 | 18 | 10.8 | Pourable salad dressing consistency | 3.6 | Good, no gelling |
| 5 | 0.4% Salt and Sodium citrate | 18.4 | 18 | 10.8 | Pourable salad dressing consistency | 3.6 | Good, no gelling |
| 6 | 0.6% Sodium citrate | 18.6 | 18 | 10.8 | Pourable salad dressing consistency | 3.6 | Good, no gelling |
| 7 | 12% Sugar | 30 | 18 | 9.6 | Pourable salad dressing consistency | 3.2 | Good, no gelling |
| 8 | 18% Sugar | 36 | 18 | 9.2 | Pourable salad dressing consistency | 3.1 | Good, no gelling |

The above results shows the successful preparation of retort heat stable soy milk up to about 3.6× concentration.

Example 5

Various concentrated soy milks were made by adding soy protein isolate into soy milk. Optionally, soybean oil or sugar was also added. To prepare the concentrated soy milk, a first sample was prepared by dispersing about 27 grams of partially hydrolyzed soy protein isolate powder (Supro XT 40, Solae Company, St. Louis, Mo.) into about 273 grams of soy milk (SunRich; 13 percent total solids; 7 percent protein) that had previously been subjected to ultra high temperature conditions to form a soy milk concentrate of about 4.1×. A second sample was prepared by dispersing about 39 g of partially hydrolyzed soy protein isolate powder (XT 40) into about 261 g of the UHT soy milk to form a soy milk concentrate of about 5.1×. Third and fourth samples were prepared by dispersing about 27 grams of Supro XT40 into about 273 grams of soy milk along with either 12 percent sugar or 12 percent soybean oil prior to homogenization. All samples were separately homogenized on a Tekmar homogenizer at 1500 rpm and 22° C. for 2 min. The XT40 has a degree of hydrolysis of having a molecular weight distribution between 5,500 and 30,000 dalton. The samples were retorted using the procedure of Example 1. After retorting, each sample was evaluated for stability. Results are shown in Table 5.

TABLE 5

| SPI, % | Additives | Total Solids, % | Soy Solids, % | Protein, % | X Factor | Viscosity, cps | Effect of Retort |
|---|---|---|---|---|---|---|---|
| 9 | None | 20.8 | 20.8 | 12.3 | 4.1 | 16 | Good, no gelling |
| 13 | None | 23.5 | 23.5 | 15.2 | 5.1 | 160 | Good, no gelling. Thick but still flowable |
| 9 | 12% Sugar | 32.8 | 20.8 | 12.3 | 4.1 | 68 | Good, no gelling |
| 9 | 12% Soybean oil | 32.8 | 20.8 | 12.3 | 4.1 | 98 | Good, no gelling |

The 4.1× soy milk creamer brewed well. Sugar enhanced the taste while soybean oil improved foam quality by decreasing foam cell size upon brewing. The 5.1× soy milk creamer was thicker, but was acceptable. It is believed that sugar or other dispersants could be added to the soy milk to enhance the dispersability of the 5.1× sample to improve the results due to the soy milk's lower starting total solids and milk viscosity.

Example 6

Various soy milk concentrates were prepared by dispersing partially hydrolyzed soy protein isolate powder (Supro XT 40, Solae Company, St. Louis, Mo.) into a previously concentrated soy milk. Soy milk was concentrated according to the procedures of Example 4. Soy protein isolate powder (XT40) was dispersed into the soy milk concentrate with and without sugar or flavors using a Tekmar mixer at 1500 rpm and at 22° C. for 2 min. The dispersions were then homogenized using an APV homogenizer at 5000 psi and at 22° C. The resultant products were retorted according to the procedures of Example 1. After retorting, each sample was evaluated for stability. The results are provided in Table 6.

TABLE 6

| SPI, % | Additives | Total Solids, % | Soy Solids, % | Protein, % | Viscosity, cps | X Factor | Effect of Retort |
|---|---|---|---|---|---|---|---|
| 6.8 | None | 17.6 | 17.6 | 12.0 | 1324 | 4 | Excellent, no gelling |
| 8.7 | 18% Sugar | 34.9 | 16.9 | 12.3 | 3092 | 4 | Good, no gelling |
| 8.7 | 18% Sugar 0.2% Vanilla | 35.1 | 16.9 | 12.0 | 3852 | 4 | Good, no gelling |

The partially hydrolyzed soy protein isolate having a molecular weight distribution between 5,500 and 30,000 dalton (i.e., XT40) dispersed readily in the centrifuged soy milk of Example 4. These SPI/soy milk dispersions remained fluid and did not gel in the presence or absence of sugar and flavor after retorting. Sugar thickened the fluid somewhat because of the increase of the total solids, but brewed nicely and had a good flavor. The SPI/soy milk also brewed well with coffee and gave a good soy latte with very stable foam.

Example 7

Comparative Example

A concentrated soy milk was prepared using the procedure of Example 6, but with a non-hydrolyzed soy protein isolate (Prolissee 500) (Cargill, Minneapolis, Minn.) instead of the partially hydrolyzed soy protein isolate used in Example 6. After retorting, the soy milk was evaluated for stability. The resultant concentrated soy milk had the properties of Table 7 and gelled upon retorting.

TABLE 7

| Description | |
|---|---|
| Non-hydrolyzed soy protein isolate | 7.7% |
| Sugar | 18% |
| Total solids | 34.1% |
| Soy solids | 16.1% |
| Protein | 12.0% |
| X Factor | 4X |
| Viscosity | Dough-like consistency, too thick to measure |
| Effect on Retort | Poor, gelled |

Comparing Examples 6 and 7, the positive effects of partial hydrolysis (i.e., a degree of hydrolysis of having a molecular weight distribution between about 5,500 and about 30,000 dalton) on the stability of concentrated soy milk is illustrated. Partial hydrolysis, as shown in Example 6, increases the solubility of soy protein in a soy milk dispersion; therefore, the addition of larger quantities of soy protein is possible to make about a 4× to about a 5× concentrated soy milk with good protein functionality. On the other hand, the non-hydrolyzed soy protein isolate of this example formed a soy concentrate that was unstable to heat treatments and gelled.

Example 8

Various concentrated soy milks were prepared by making an oil-in-water emulsion through homogenization of a partially hydrolyzed soy protein isolate, oil, and water. Pre-emulsions were prepared by mixing the soy protein, oil, and water at 1500 rpm and 22° C. on a Tekmar mixer for 2 min. Each pre-emulsion was homogenized on a Gaulin homogenizer at 5000 psi and 22° C., and then retorted per the conditions of Example 1. The emulsions were made using either PRO FAM 781 (ADM, Decatur, Ill.) (molecular weight distribution between 5,500 and 20,000 dalton), Supro XT 40 (Solae Company) (molecular weight distribution between 5,500 and 30,000 dalton), or PRO FAM 930 (ADM) (molecular weight distribution between 13,000 and 70,000 dalton). The oil was either soy bean oil (SB), coconut palm kernel oil (CPKO), high oleic canola oil (HOCO), or anhydrous milk fat (AMF). After retorting, each sample was evaluated for stability. The results are provided in Table 8.

TABLE 8

| SPI, grams | SPI | Oil, grams | Oil | Total Solids, % | Soy Solids, % | Protein, % | Viscosity, cps | X Factor | Effect of Retort |
|---|---|---|---|---|---|---|---|---|---|
| 360 | PRO FAM 781 | 180 | SB | 27 | 18 | 15.2 | 102 | 5 | Good, no gelling |
| 390 | XT40 | 180 | SB | 28.5 | 19.5 | 15.2 | 458 | 5 | Good, no Gelling |
| 360 | PRO FAM 781 | 180 | CPKO | 27 | 18 | 15.2 | 56 | 5 | Good, no Gelling |
| 360 | PRO FAM 781 | 180 | HOCO | 27 | 18 | 15.2 | 96 | 5 | Good, no Gelling |
| 360 | PRO FAM 781 | 180 | AMF | 27 | 18 | 15.2 | 88 | 5 | Good, no Gelling |
| 360 | PRO FAM 930 | 180 | SB | 27 | 18 | 15.2 | Like cookie dough | 5 | Too thick to homogenize and Retort |

The soy milks were all fluid-like and flowable (except that prepared from PRO FAM 930) and had good mouthfeel. The samples did not gel upon retorting even at 5× levels. These samples all had 7.9 grams of soy protein per 52 gram serving.

Example 9

Comparative Example

A concentrated soy milk was prepared using the procedure of Example 8, but with a non-hydrolyzed soy protein isolate (Prolissee 500, Cargill, Minneapolis, Minn.) instead of the partially hydrolyzed soy protein isolate used in Example 8. After retorting, the sample was evaluated for stability. The resultant concentrated soy milk had the properties of Table 9 and was too thick to homogenize and retort.

TABLE 9

| Description | |
|---|---|
| Non-hydrolyzed Soy Protein Isolate | 17.5% |
| Soy Bean Oil | 9% |
| Total Solids | 26.5% |
| Soy Solids | 17.5% |
| Protein | 15.2% |
| X Factor | 5X |
| Viscosity | Like cookie dough |
| Effect of Retort | Too thick to homogenize and retort |

Comparing examples 8 and 9, the positive effects of partial hydrolysis of the soy protein (i.e., a degree of hydrolysis to provide a molecular weight distribution between about 5,500 and about 30,000 dalton on the stability of concentrated soy milk is illustrated. The partial hydrolysis, as shown in Example 8, increases the solubility of soy protein in an oil-in-water emulsion; therefore, the addition of larger quantities of soy protein was possible to make a 5× concentrated soy milk with good protein functionality. On the other hand, the non-hydrolyzed soy protein isolate of this example formed a soy concentrate that was too thick to homogenize and retort.

It will be understood that various changes in the details, materials, and arrangements of formulations and ingredients, which have been herein described and illustrated in order to explain the nature of the method, may be made by those skilled in the art within the principle and scope of the embodied method as expressed in the appended claims.

What is claimed is:

1. A method of preparing a heat stable soy milk concentrate comprising:
    removing a portion of soluble carbohydrates from a soy milk using an ultrafiltration membrane to form an intermediate soy milk;
    concentrating the intermediate soy milk to form a heat stable soy milk concentrate;
    wherein the heat stable soy milk concentrate has greater than about 9.5 percent to about 10.5 percent soy protein; and
    wherein the heat stable soy milk concentrate is stable upon experiencing heat treatment sufficient to achieve an $F_o$ of at least about 5.

2. The method of claim 1, wherein the heat treatment is sufficient to achieve an $F_o$ of at least about 10.

3. The method of claim 1, wherein the heat stable soy milk has a viscosity of about 15 to about 4,000 cps.

4. The method of claim 1, wherein about 70 percent to about 99 percent of the soluble carbohydrates are removed from the soy milk.

5. The method of claim 1, wherein the intermediate soy milk has between about 11 and about 15 percent total solids.

6. The method of claim 1, wherein the total solids of the heat stable soy milk concentrate are soy solids.

7. The method of claim 1, wherein the ultrafiltration membrane has a MWCO greater than about 1,000.

8. The method of claim 7, wherein the ultrafiltration membrane has a MWCO of about 1,000 to about 50,000.

9. The method of claim 1, further comprising adding about 0.1 to about 0.6 percent salt and about 7 to about 20 percent sugar.

10. A method of preparing a heat stable soy milk concentrate comprising:
    removing a portion of soluble carbohydrates from a soy milk using an ultrafiltration membrane and removing a portion of insoluble carbohydrates from the soy milk using centrifugal forces to form an intermediate soy milk;
    concentrating the intermediate soy milk to form a heat stable soy milk concentrate;
    wherein the heat stable soy milk concentrate has greater than about 9.5 percent to about 11 percent protein; and
    wherein the heat stable soy milk concentrate is stable upon experiencing heat treatment sufficient to achieve an $F_o$ of at least about 5.

11. The method of claim 10, wherein about 70 to about 99 percent of the insoluble carbohydrates are removed from the soy milk.

12. The method of claim 11, wherein the total solids of the heat stable soy milk concentrate are soy solids.

13. The method of claim 10, further comprising adding about 7 to about 20 percent sugar.

14. The method of claim 10, further comprising adding about 0.4 to about 0.8 percent sodium citrate.

15. The method of claim 14, further comprising adding about 0.1 to about 0.5 percent salt.

16. The method of claim 11, wherein about 70 percent to about 99 percent of the soluble carbohydrates are removed from the soy milk.

* * * * *